Jan. 2, 1940.   C. R. NEESON   2,185,473
COMPRESSOR UNLOADING MEANS
Filed Dec. 2, 1937   14 Sheets-Sheet 1
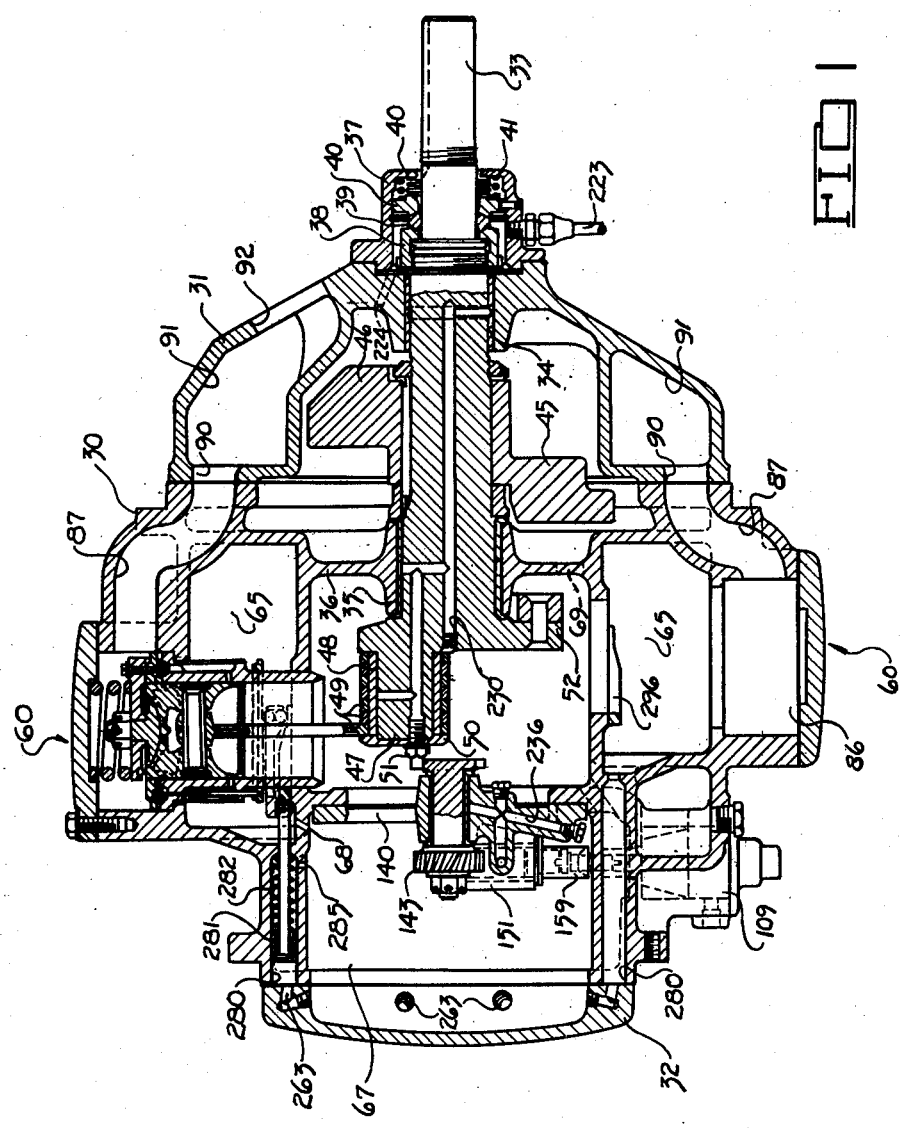
INVENTOR
CHARLES R. NEESON
BY
ATTORNEY

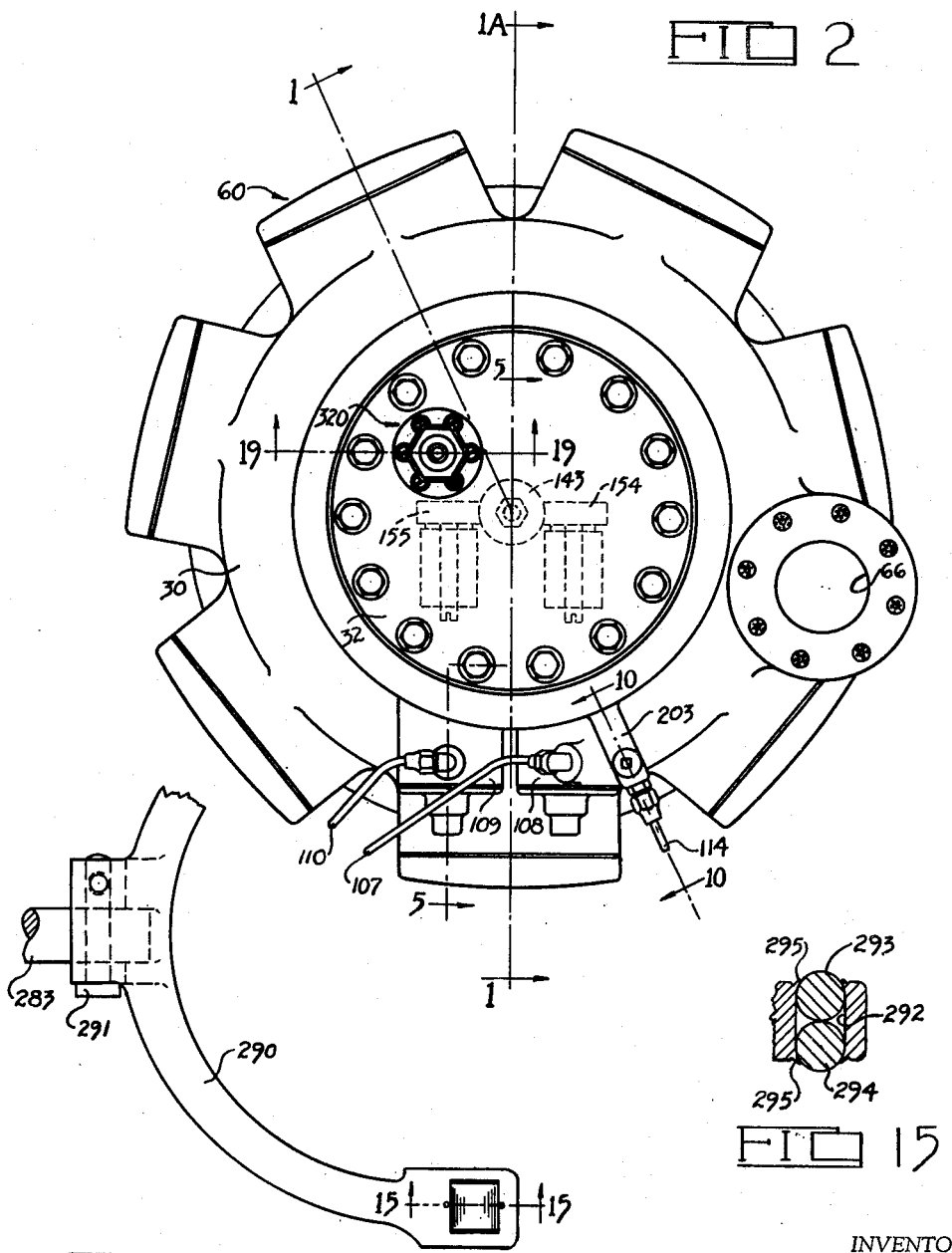

Jan. 2, 1940.　　　　C. R. NEESON　　　　2,185,473
COMPRESSOR UNLOADING MEANS
Filed Dec. 2, 1937　　　14 Sheets-Sheet 3
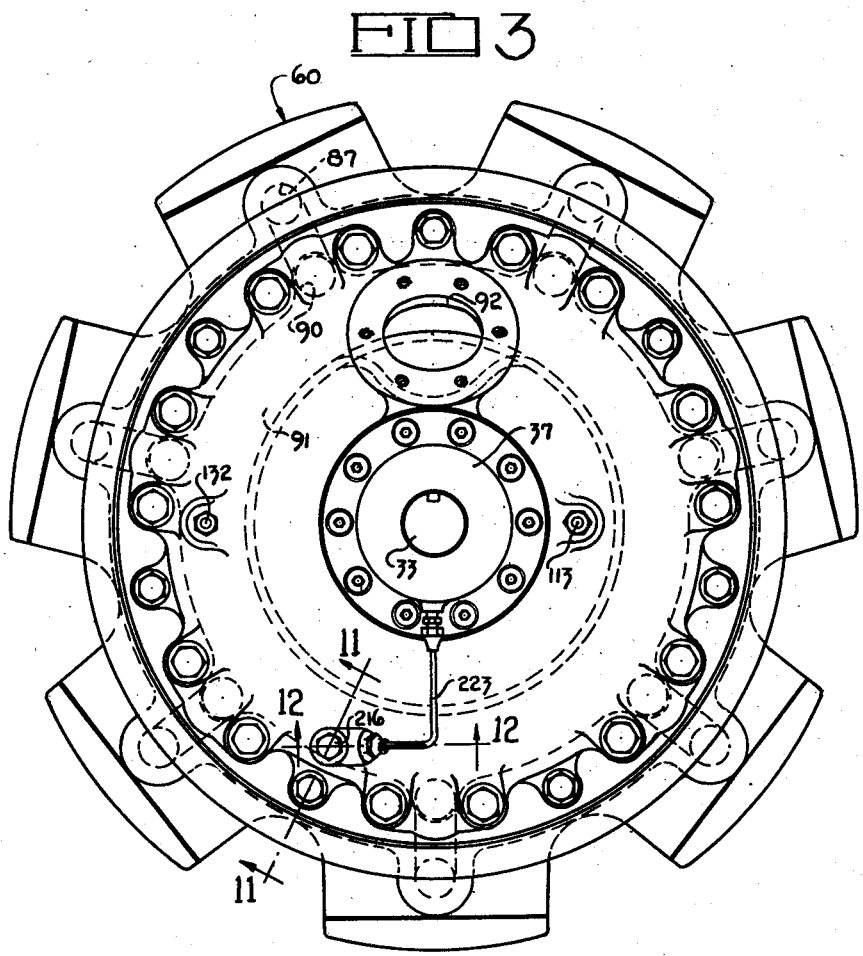
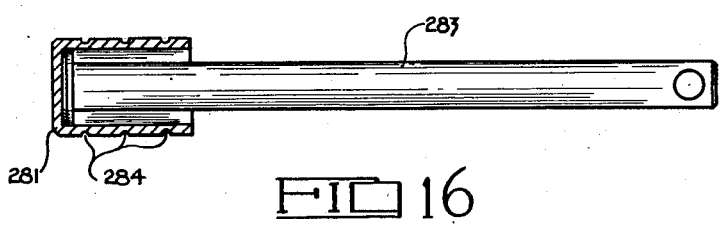
INVENTOR.
CHARLES R. NEESON
BY *Harness, Lind, Patee & Harris*
ATTORNEY.

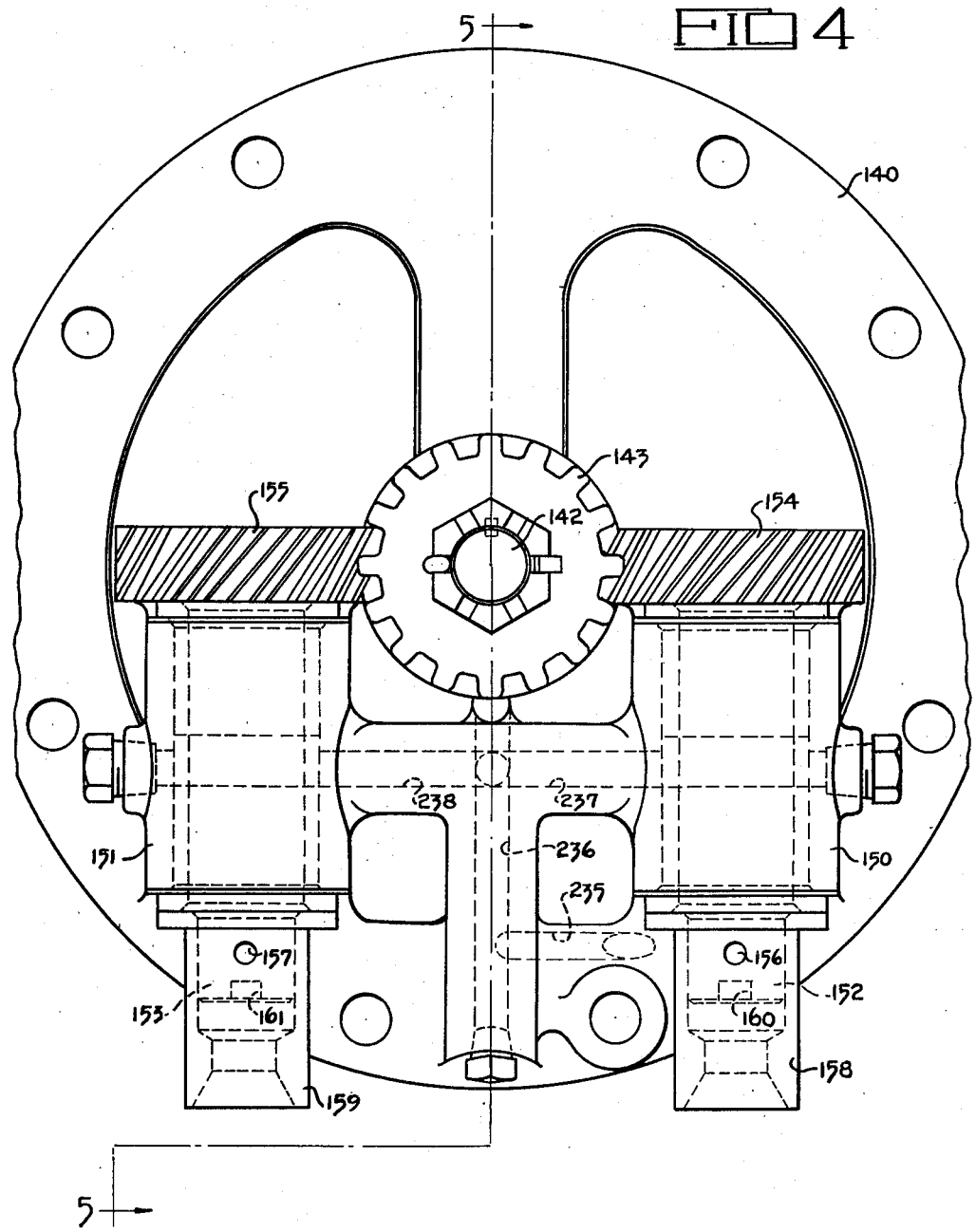

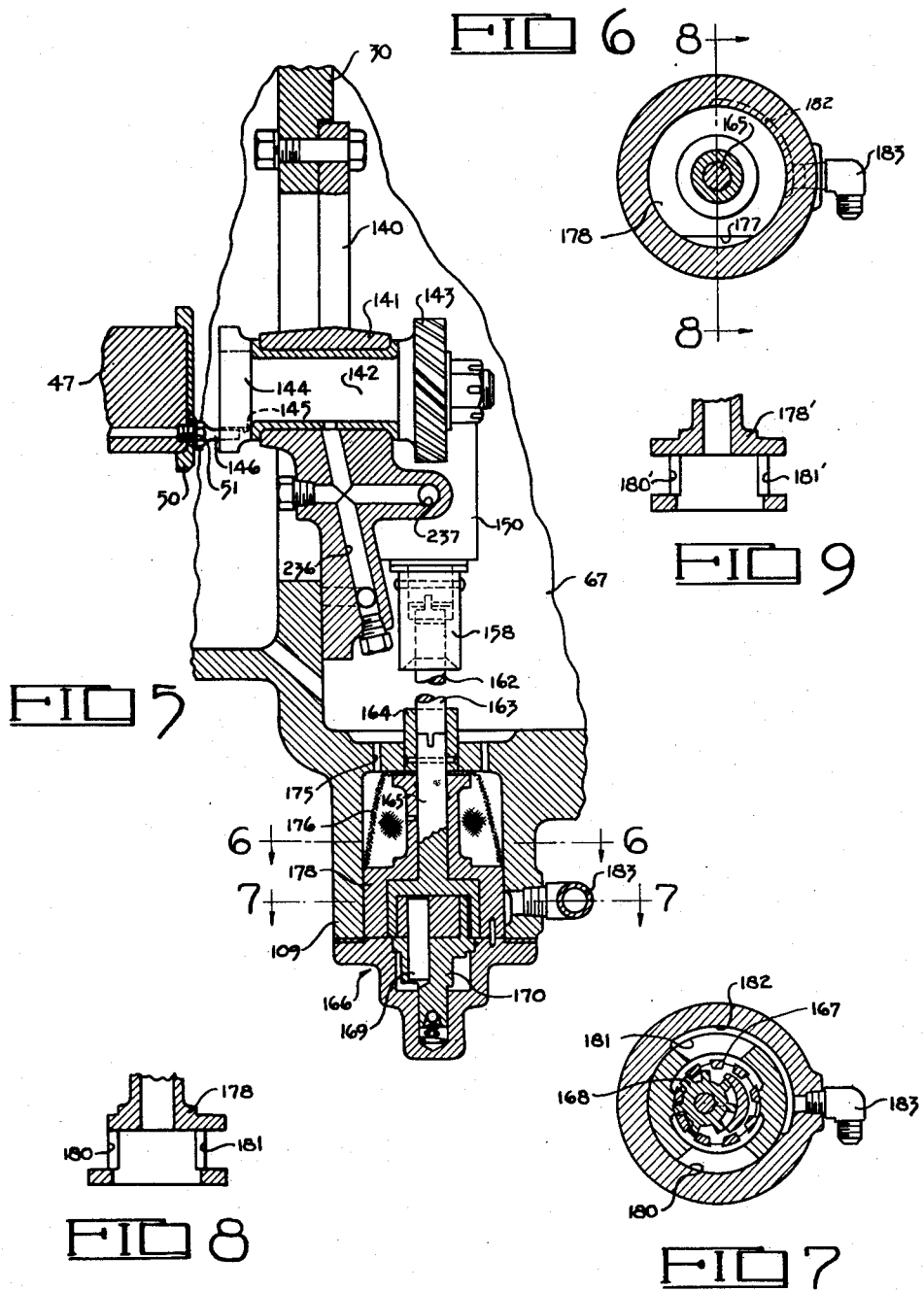

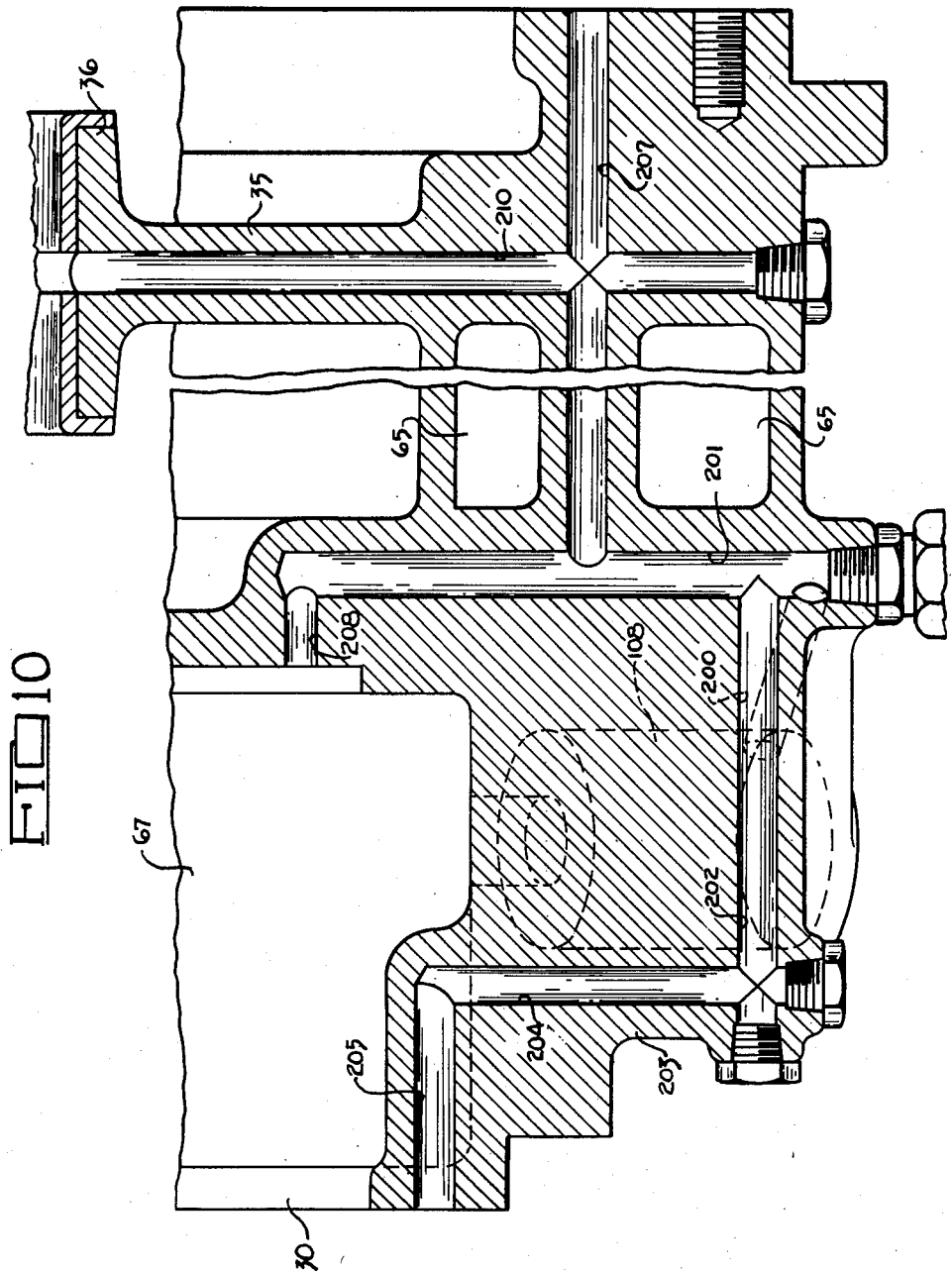

Jan. 2, 1940.  C. R. NEESON  2,185,473
COMPRESSOR UNLOADING MEANS
Filed Dec. 2, 1937  14 Sheets-Sheet 7

INVENTOR.
CHARLES R. NEESON
BY Harness, Dind, Patee & Harris
ATTORNEY.

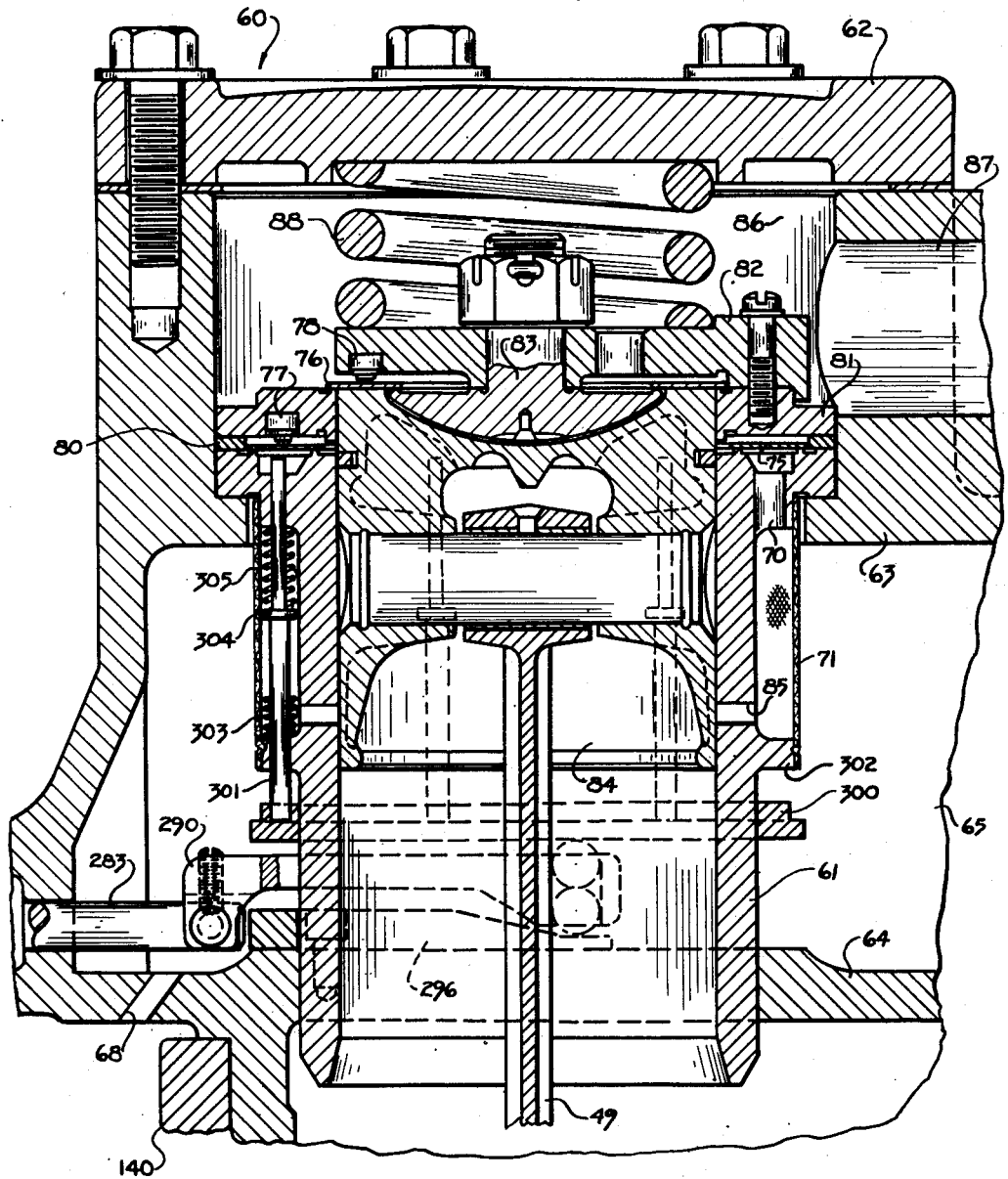

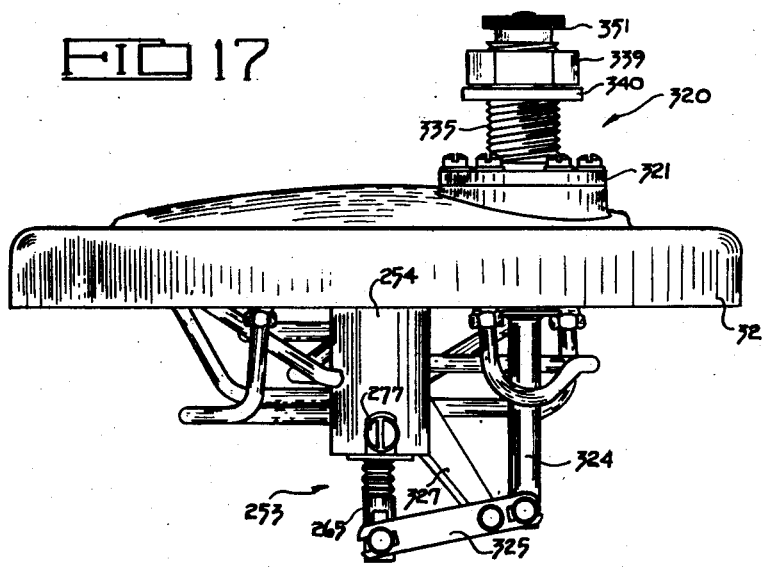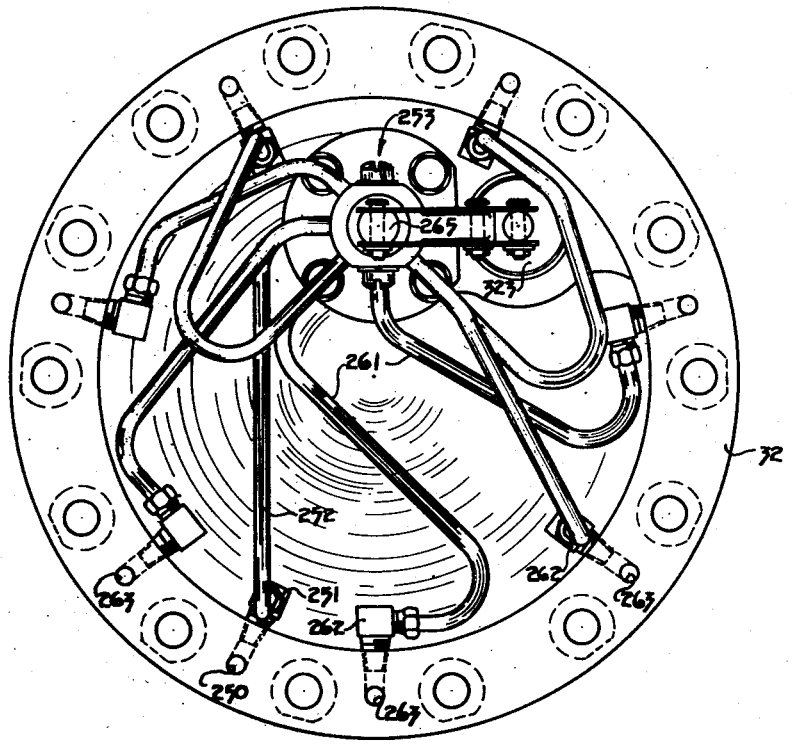

Jan. 2, 1940. C. R. NEESON 2,185,473
COMPRESSOR UNLOADING MEANS
Filed Dec. 2, 1937 14 Sheets-Sheet 10
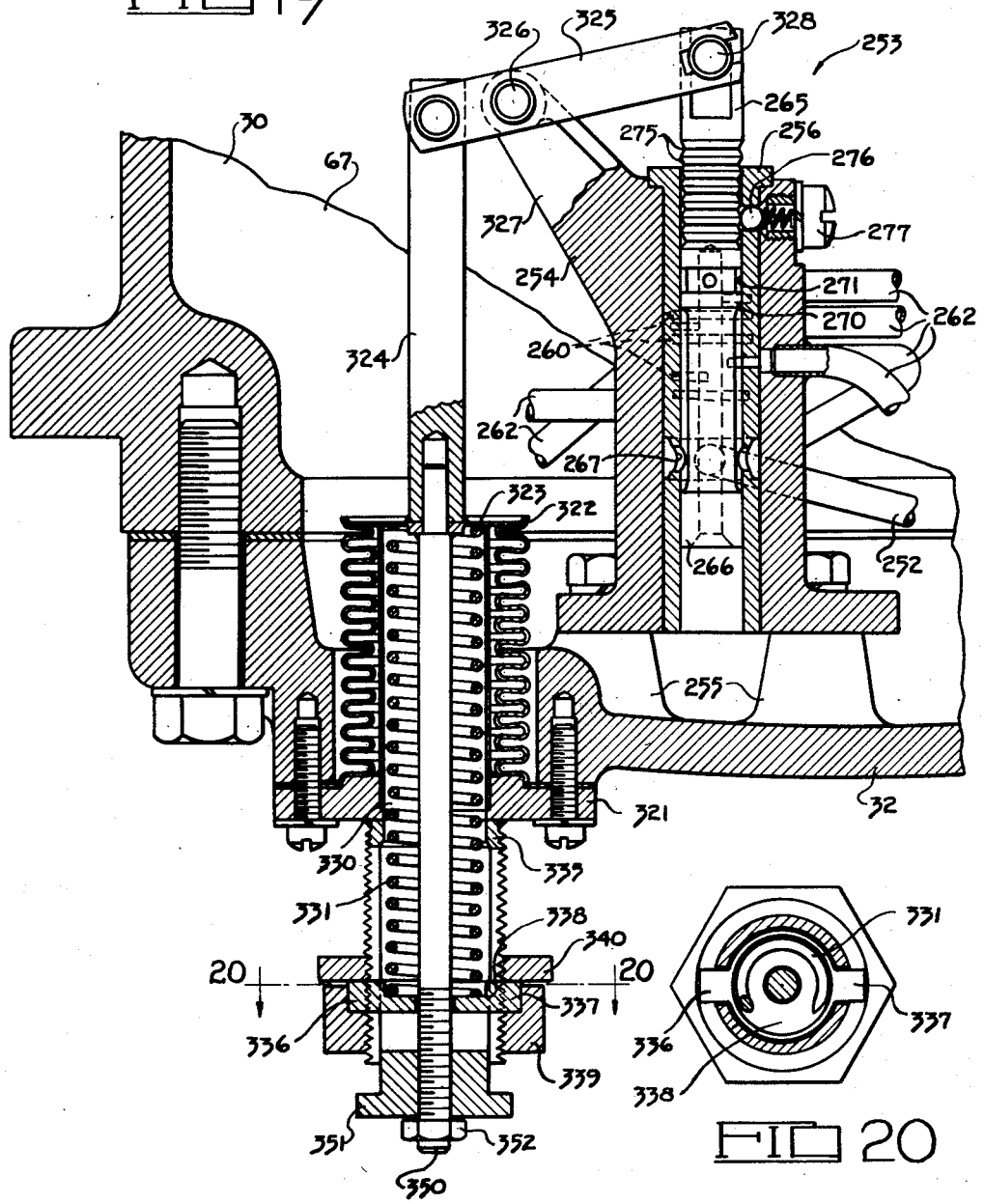
INVENTOR.
CHARLES R. NEESON
BY Harness, Dind, Pates & Harris
ATTORNEY.

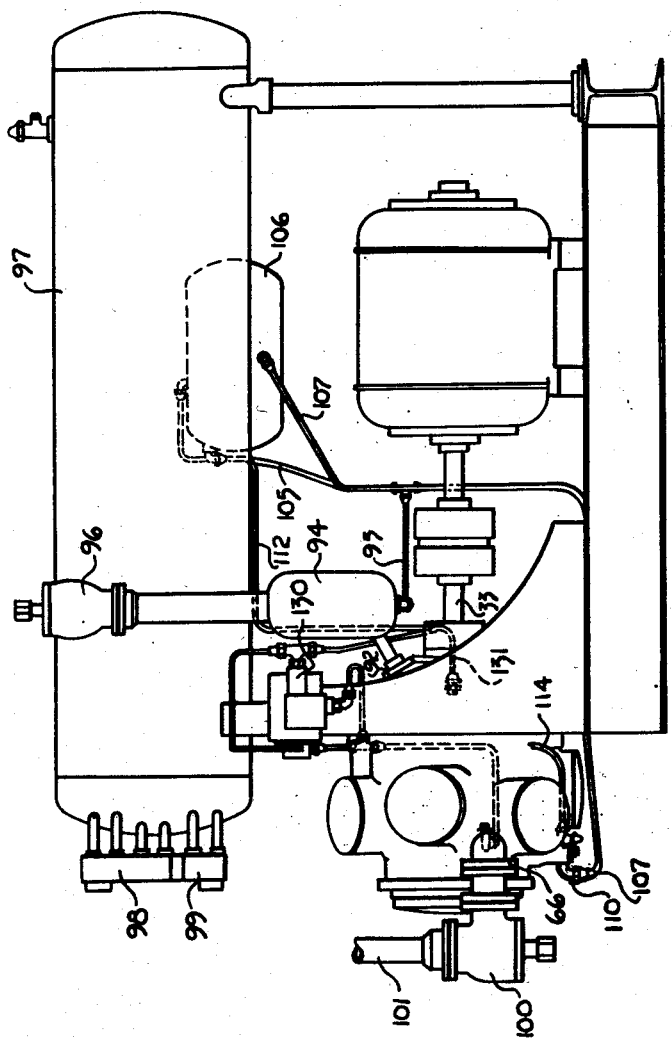

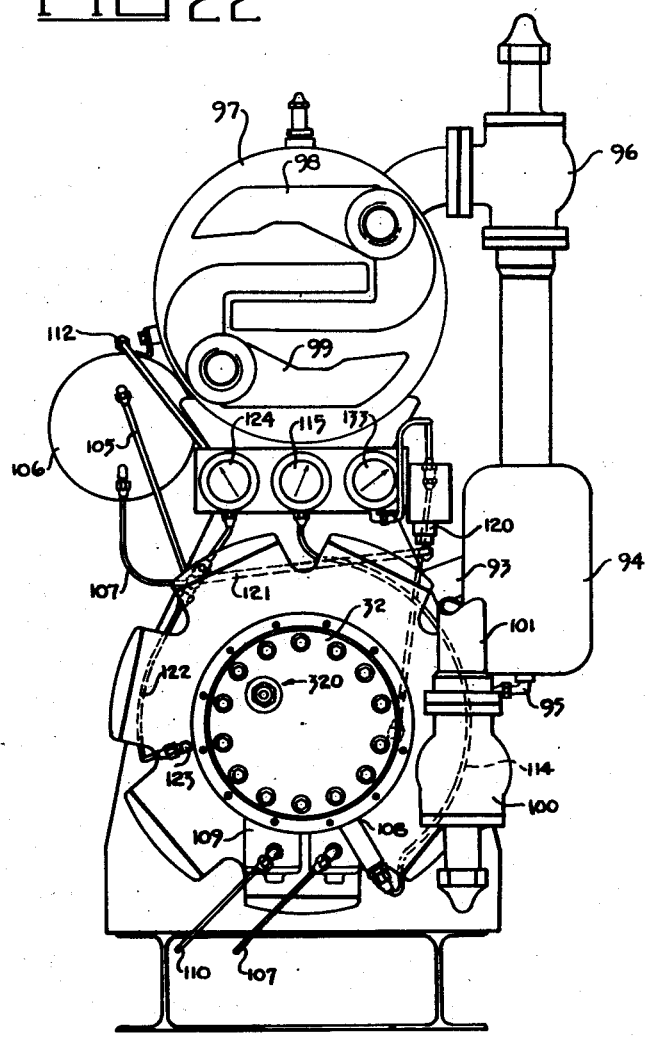

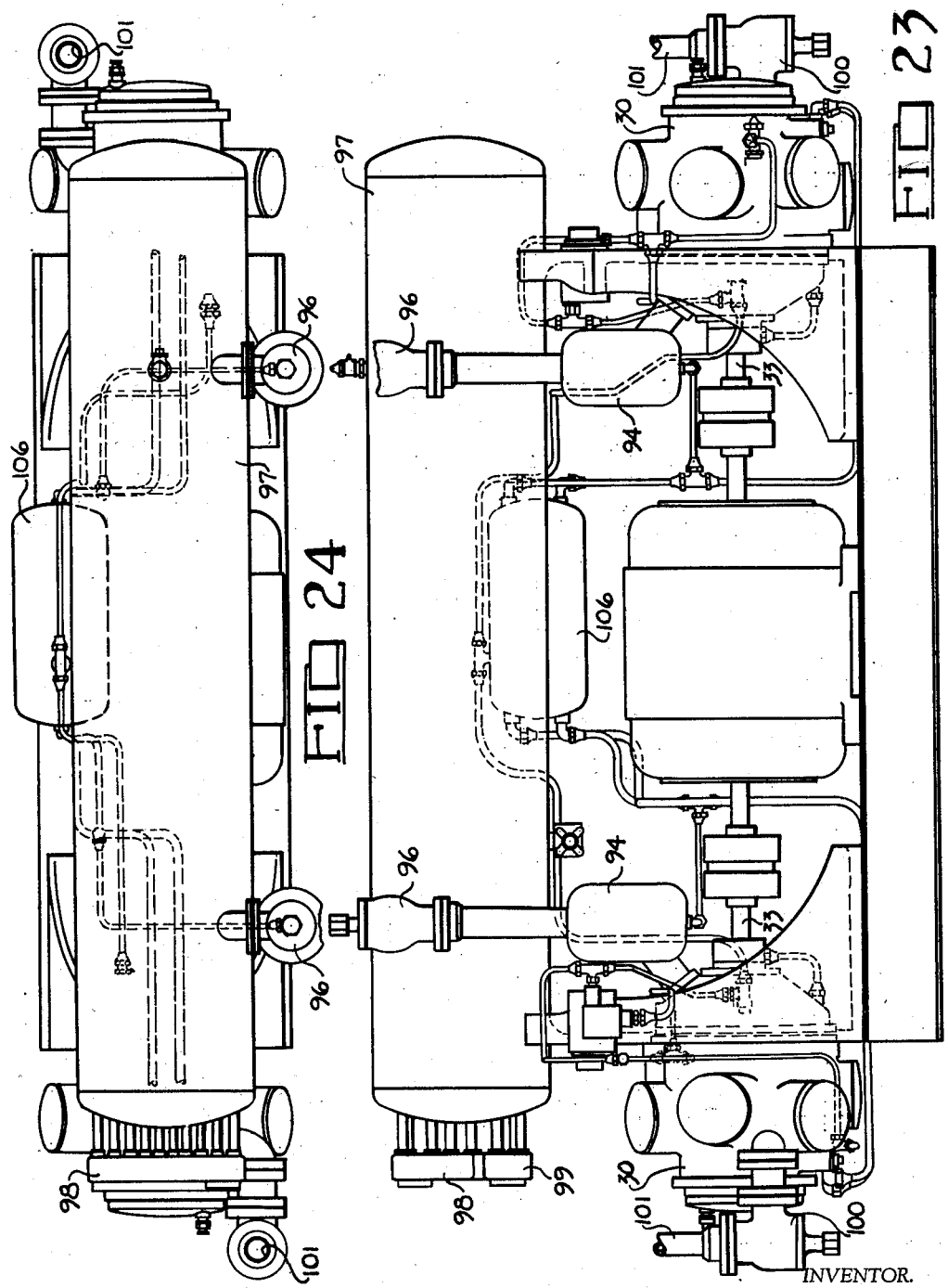

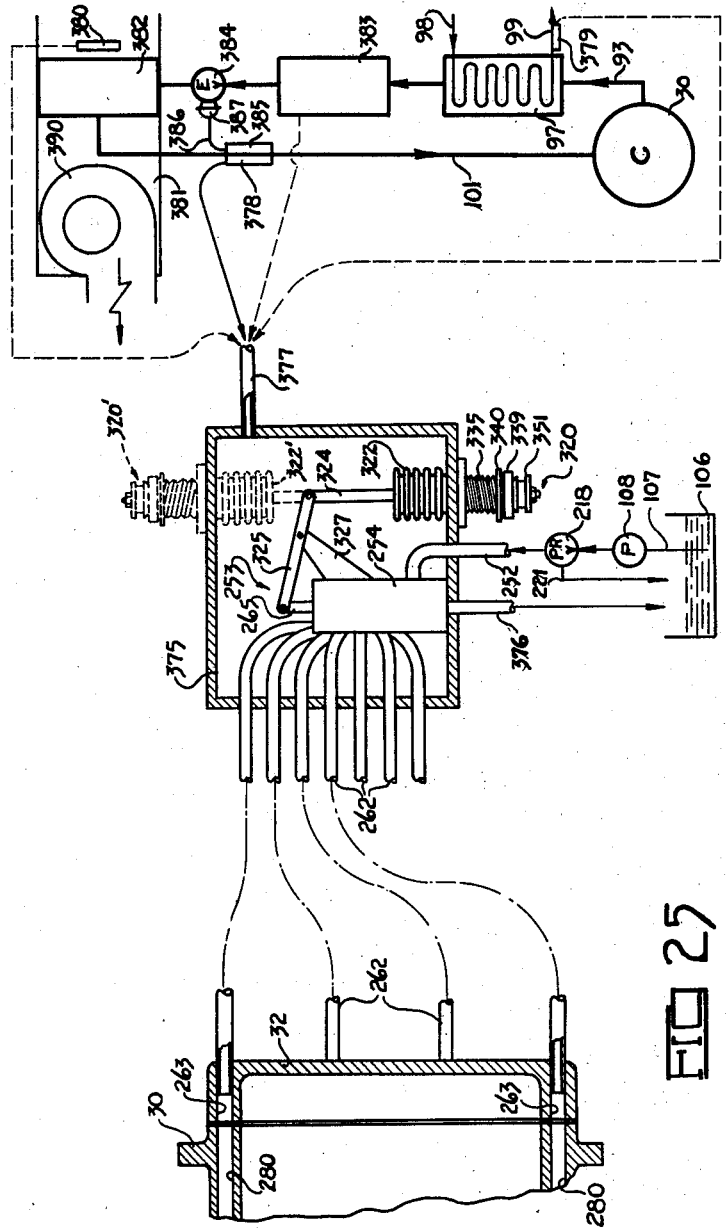

Patented Jan. 2, 1940

2,185,473

UNITED STATES PATENT OFFICE 2,185,473

COMPRESSOR UNLOADING MEANS

Charles R. Neeson, Dayton, Ohio, assignor, by mesne assignments, to Chrysler Corporation, Highland Park, Mich., a corporation of Delaware Application December 2, 1937, Serial No. 177,694

9 Claims. (Cl. 230—28)

My present invention relates to compressors and to refrigeration systems of the compressor-condenser-evaporator type of general utility such as air compressors, having special reference to air conditioning systems. An object of the present invention is to devise a compressor of variable capacity which may be so operated as to deliver maximum refrigeration, or fractions thereof in several fractional amounts. A secondary object of my invention is to devise a compressor capable of delivering a large amount of refrigeration in comparison to the weight of the compressor, which consumes power in proportion to the refrigeration delivered, whereby economical air conditioning or commodity cooling is rendered possible. A third object of my invention is to devise a compressor which is easy to manufacture, assemble, service and repair. A further object of my invention is to devise means to control the operation of a compressor used in a refrigeration system.

The objects of my invention are attained by the use of a radial compressor having a common crank for a plurality of radially spaced pistons, each piston operating in a removable cylinder lining, and each piston and cylinder combination being supplied with readily removable suction and discharge valves, all parts of any cylinder and piston combination being readily interchangeable with like parts of another combination.

Figure 11:
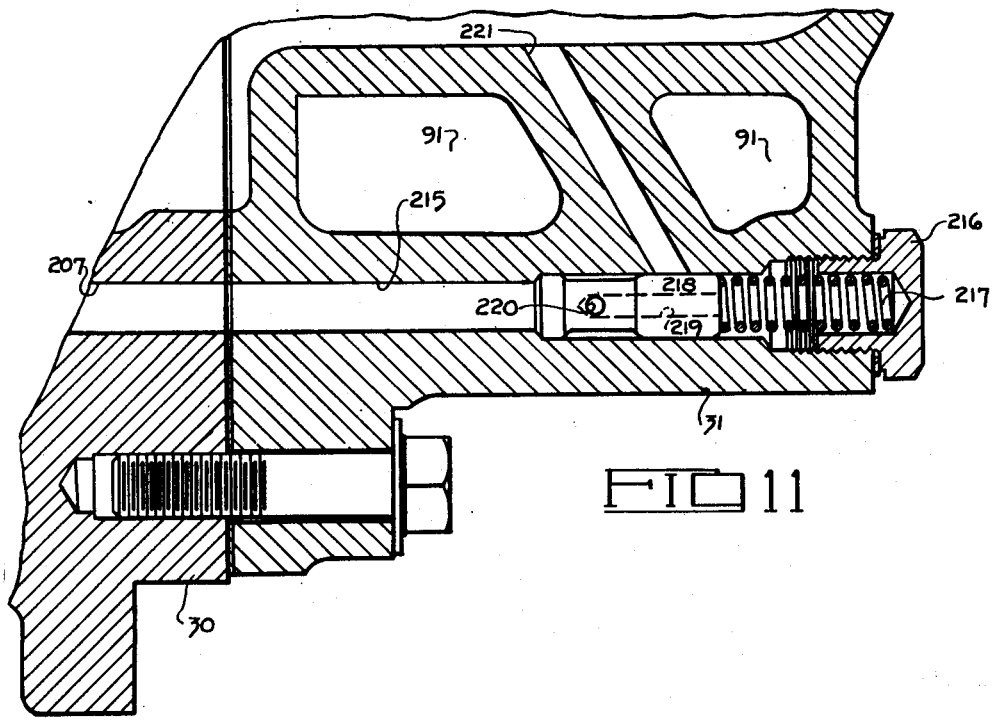
Figure 12:
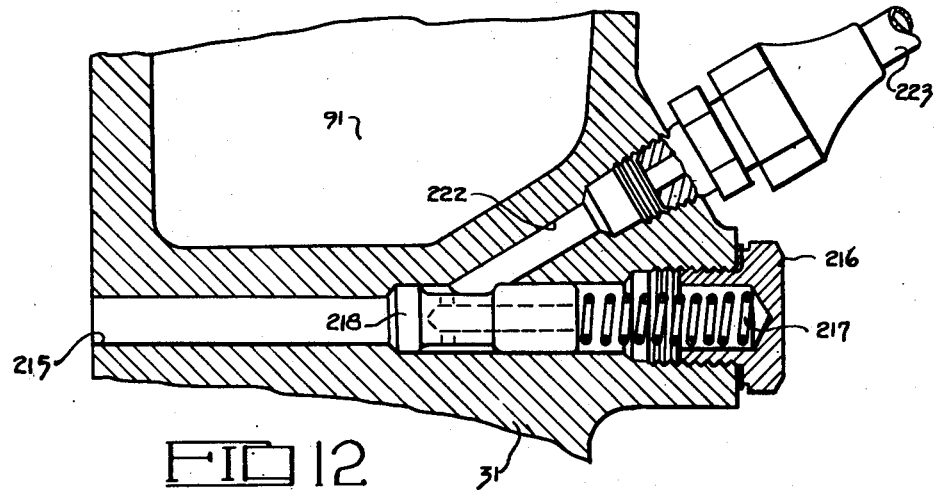

The objects and advantage of my invention will be more readily apparent from an inspection of the following specification taken in connection with the accompanying drawings wherein Fig. 1 is a cross-section through the compressor taken along line 1—1 of Fig. 2 as to the major portion of the figure and taken along line 1—1A of Fig. 2 as to the rear or right-hand portion of Fig. 1; Fig. 2 is a front elevation of the compressor; Fig. 3 is a rear elevation of the compressor; Fig. 4 is a front elevation of a portion of the compressor comprising a pump gear and pump shaft assembly; Fig. 5 is a vertical section, the upper portion thereof being taken along line 5—5 of Fig. 4 and the lower portion thereof being taken along line 5—5 of Fig. 1; Fig. 6 is a horizontal cross-section through a scavenger pump taken along line 6—6 of Fig. 5; Fig. 7 is a lower horizontal cross-section through the scavenger pump taken along line 7—7 of Fig. 5; Fig. 8 is a vertical cross-section through the scavenger pump gear casing showing inlet and outlet ports; Fig. 9 is a view, similar to Fig. 8, of the force pump gear casing showing inlet and outlet ports, all other parts of the force pump being similar to like parts of the scavenger pump detailed in Figs. 5 to 7; Fig. 10 is a section taken longitudinally through the lower portion of the compressor housing along line 10—10 of Fig. 2 showing passages through the housing for the flow of lubricating medium from the force pump to various portions of the apparatus requiring lubrication; Fig. 11 is a section taken through the rear cover of the compressor housing along line 11—11 of Fig. 3 showing an oil pressure relief valve; Fig. 12 is a section taken along line 12—12 through the rear portion of the compressor housing showing further details of the lubricating system at the oil pressure relief valve; Fig. 13 is an enlarged view of a portion of the compressor taken along the centerline of any cylinder and piston showing details of the cylinder, piston and valve assembly, and also, showing details of the unloader mechanism whereby an individual cylinder may be caused to compress gas or may be rendered ineffective as desired or demanded; Fig. 14 is a detail view of a valve-lifting member forming a portion of the unloading system; Fig. 15 is a cross-section taken along line 15—15 of Fig. 14 showing details of the valve-lifting mechanism; Fig. 16 is a detail view of the unloader piston rod; Fig. 17 is a top plan view of the front cover showing the unloader master piston and unloader control device; Fig. 18 is an inside elevation of the front cover shown in Fig. 17; Fig. 19 is an enlarged cross-sectional view taken along line 19—19 of Fig. 2 showing details of the unloader master piston, master valve, and unloader control device; Fig. 20 is a cross-section taken along line 20—20 of Fig. 19 showing details of the unloader control device; Fig. 21 is a side elevation of a condensing unit having the compressor of my invention installed on a base, coupled to a motor, and showing the use of the compressor in connection with a water-cooled condenser, a further object of the view being to complete the disclosure of the invention by showing the oil tank and oil tubing connections; Fig. 22 is an end elevation of the assembly shown in Fig. 21; Fig. 23 is a view similar to Fig. 21 showing a double-ended assembly, which is to say that the view shows the possibility of associating two of my compressors with a common motor and oil system; Fig. 24 is a top plan view of the assembly shown in Fig. 23; and Fig. 25 is a schematic view of a modification of my invention.

My compressor comprises three principal casings which are, main housing 30, a rear cover 31, and a front cover 32, the three housings being bolted together and sealed by gaskets as shown in the several views, whereby the entire compressor assembly may be disassembled as desired. The compressor further comprises a main shaft 33 journalled in a bearing 34 formed in the rear cover 31, and a main bearing 35 supported by a bearing journal 36 cast integrally with the main housing 30. In order to prevent the escape of refrigerant from the compressor housing, the shaft is sealed by a seal 37 which, in the preferred type shown in Fig. 1, comprises a base member 38 screwed onto a threaded portion of shaft 33 and locked thereon, a sealing ring 39 having a spherical face engaging a spherical face on the bearing member and an opposed spherical face bearing against a spherical face on a pressing member 40, a compressing member being urged against the sealing ring by a coil spring 41, the opposite end of which engages a flange of the seal housing. The flanges of the seal housing and of the pressing member are joined together by a flexible metallic bellows 42. The seal herein is a type at present available on the market and it is to be appreciated that other types of seals may be utilized.

The shaft in general comprises a shaft similar to that disclosed and claimed in the patent to Lee, No. 2,047,420, dated July 14, 1936, and includes a pair of counter-balances 45 and 46 which are locked onto the shaft as shown in Fig. 1, which tend to smooth vibration by acting as flywheels and which eliminate vibrations due to shaft whipping as fully set forth in the afore-mentioned patent to Lee. The front end of the shaft beyond the main bearing 35 is provided with a crank pin 47 which is surrounded by a bearing ring 48 forming the bearing surface for a plurality of piston rods 49, in this case there being seven shown, one for each of the seven cylinders shown. The bearing rods are held on the bearing by a cap 50 and locking pin 51, details of which are more fully set forth in my co-pending application, Serial No. 145,586, filed May 29, 1937. The weight of the crank pin is counterbalanced by a balance weight 52, which completes the balancing means of the rotating assembly. It is to be appreciated that the number of piston rods 49 may vary as desired, it being practical, however, to build compressors having 3, 5 or 7 cylinders, due to the range of capacity made possible by my present invention.

Each piston rod 49 extends radially toward its associated cylinder 60, the details of which are more fully set forth in Fig. 13. As shown in Figures 2 and 3, the cylinders are radially, equally spaced about the centerline of the compressor. Each cylinder is offset longitudinally of the compressor by an amount equal to the distance between centers of the piston rods 49. Each cylinder comprises a cylinder liner 61 which is inserted through the outer end of the cylinder when a cylinder head 62 is removed. The cylinder liner is supported by the outer wall 63, and maintained in alignment by an opening through the inner wall 64, of a suction manifold 65, communicating with the associated refrigerating system through a suction port 66 (Fig. 2) and also communicating with the interior 67 through one or several openings 68 through the wall 64. The suction manifold is also in communication with the interior of the rear cover 31 through one or more openings 69 (Fig. 1) through the journal 36. The entire interior of the compressor is therefore submitted to pressure equal to the suction pressure of the refrigerating system with which it is associated.

The refrigerant entering the compressor through suction port 66 is admitted to each cylinder space through suction valve ports 70 annularly spaced about the wall of the cylinder liner 61 and surrounded by a screen 71 formed of a plurality of layers of fine mesh screen which prevents the admission of scale or dirt to the valve assembly. The gas is admitted upon the raising of the suction valve 75 and discharged from the cylinder upon the raising of the discharge valve 76 against the pressures of their associated valve springs 77 and 78, respectively. The valves 75 and 76 are flat rings of saw steel or the like, and are retained in the assembly shown by means of a suction valve spacing ring 80 resting upon the upper surface of the cylinder liner 61 and a discharge valve assembly comprising a supporting ring 81, resting upon the spacer 80, which is bolted to a spider 82 holding a discharge button 83 which is formed to fit a concavity in the end of the piston 84. The details and operation of the piston, cylinder liner and valve assembly are more fully set forth and claimed in my co-pending application, now Patent No. 2,137,965 dated November 22, 1938, it being sufficient for the present invention to state that each reciprocation of the piston 84 results in gas being admitted to the cylinder space as soon as the difference in pressure in the suction manifold 65 and within the cylinder space becomes great enough to overcome the strength of springs 77; as soon as the piston has retracted to the far end of its stroke, more gas may be admitted from annulus 65 through a plurality of supplementary suction ports 85 which insure the filling of the cylinder space with gas at suction pressure; as the piston commences to move outward the supplementary ports 85 are immediately closed and the suction valve 75 is soon closed due to the increase in cylinder pressure over the suction pressure; as soon as the pressure within the cylinder becomes greater than the pressure in the discharge space 86 the discharge valve 76 is raised against its springs 78 and the gas is permitted to pass outward through discharge ports 87 associated with each cylinder. Upon retraction of the piston, the discharge valve is first seated and the suction valve opened whereupon a repetition of the cycle takes place. The discharge button 83 permits maximum efficiency due to minimum clearance made safe by such a construction, and a safety spring 88 further protects the mechanism as set forth in the co-pending application.

Each of the discharge ports 87 extends through the main housing 30 and leads to an opening 90 into a discharge manifold 91 surrounding the interior circumference of the rear cover 31 so that all of the gas compressed by each cylinder is admitted to the discharge annulus 91 and passes from the compressor through a main discharge port 92, as shown in Figs. 21 to 24 inclusive. The main suction port 66 may be connected through a main suction shut-off valve 95 to a pipe 96 leading to refrigerating mechanism, and the main discharge port 92 may be connected by means of a discharge pipe 93 to an oil separator 94 by means of which any lubricant entrained with the compressed gas is separated and returned to the system through an oil return passage 95. The compressed gas passes through connections and a main discharge shut-off valve 96 into a water-cooled condenser 97 having water inlet manifold 98 and water outlet manifold 99. Of course, the compressed refrigerant may pass into some other type of condenser, but the present type is a practical form of condenser which may be associated with the present invention.

Lubricant which is separated from the compressed refrigerant passes through pipe 95 into an oil return tube 105 leading to an oil tank 106 which may be conveniently mounted upon the condenser 97 at a height sufficient to cause the oil to flow into the compressor under the influence of gravity through a feed pipe 107. The feed pipe 107 leads to the intake port of a force pump 108 by means of which lubrication of all moving parts within the compressor is accomplished. Adjoining the force pump 108 is a scavenger pump 109 which removes oil from the interior of the compressor and forces it through pipe 110 which is connected to pipes 95 and 105 which lead into the oil tank 106. By means of the separate oil tank 106, which may be made of pressed steel or other light material, the weight of the compressor housing, which is made of cast iron, may be materially reduced, thereby accomplishing one of the ends of my invention which is to increase the tonnage of refrigeration delivered per pound of condensing unit. Oil separated by the separating device 94 is returned through pipe 95 by the pressure of the discharged gas. In order to balance pressures within the oil tank, a pipe 112 is connected at 113 (Fig. 3) with the discharge manifold interior 91, which connection insures the subjection of the oil in the oil tank 106 to discharge pressure so that the combined effects of gravity and discharge pressure will insure the return of oil through pipe 107 to the force pump 108.

As an incidental means of registering pressures, a connection 114 may extend from the force pump 108 to an oil pressure indicating gauge 115, in order that the operator of the machine may instantly determine if sufficient oil pressure is being created by the force pump 108. Also, in order to prevent damage to the machine, high-pressure and low-pressure cut-outs may be provided, connected to the refrigerating or air conditioning system as fully set forth in my co-pending application, Serial No. 145,586, filed May 29, 1937. The low-pressure cut-out 120 may be connected by means of a pipe 121 branching from a pipe 122 having communication at 123 with the interior of the suction manifold 65. A second branch of the pipe 122 may lead to a low-pressure gauge 124 by means of which the operator may instantly determine the suction pressure of the system. The high-pressure cut-out 130 is connected by means of a pipe 131 having communication at 132 with the interior of the discharge manifold 91, and a branch of pipe 131 may lead to a high-pressure gauge 133 by means of which the operator can readily determine the discharge pressure at which the system is operating.

In order to operate the oil pumps, an oil pump gear assembly is provided comprising a gear holding member 140 attached to a portion of the main housing 30 and provided with a main bearing 141 within which is positioned a gear shaft 142 to which is attached a helical gear 143, the opposite end of the shaft being enlarged to provide a balancing disk 144 in which is a radially extending slot 145 engaging a driving pin 146 extending from the end of the bearing cap locking pin 51. The gear supporting member 140 is also provided with parallel, vertical bearings 150 and 151, which support shafts 152 and 153, respectively. The upper ends of shafts 152 and 153 are attached to helical gears 154 and 155, respectively, the gears meshing with gear 143 at opposite sides thereof and being rotated thereby.

The lower ends of the shafts are pinned by means of pins 156 and 157, respectively, to coupling members 158 and 159, and are also provided with slots 160 and 161, the coupling members and slots forming means whereby the gears may be caused to operate the force and scavenger pumps through connecting shafts 162 and 163, respectively. Each of the connecting shafts extends into a connecting member such as 164 which together with the tongue and slot connections illustrated in Fig. 5 form a means of connecting the gears to the shaft 165 of an automatically reversible pump 166, the scavenger pump being illustrated in Figs. 5, 6, 7 and 8. The pump comprises the driving shaft 165 which terminates in a disk having a plurality of longitudinally extending driving gear teeth 167 which mesh with the teeth of an idler gear 168 mounted upon a shaft 169 held in an idler gear support and assembly 170. The details of such a pump are more fully set forth and the combination thereof in a refrigerating compressor is claimed in my co-pending application, Serial No. 145,586, filed May 29, 1937. In the present application thereof, the same requirements of being capable of forcing the lubricating medium in one direction regardless of the direction of rotation of the main shaft and the gears is also present, and the gear assembly is shown as required for such operations. Regardless of the direction of rotation of the gear 143, oil which may collect in the interior of the crank case is permitted to drain through openings 175 into the interior of the scavenger pump housing 109. A conical screen 176 surrounds the interior of the pump housing so as to prevent the admission of any scale or dirt into the pump gears. The oil thus admitted and strained, flows downward through an opening 177 in the top wall of the pump gear housing 178, which opening communicates with the pump suction port 180. If the compressor is rotated in one direction, the pump gear and crescent assembly will be as shown in Fig. 7 with the oil being fed into pump suction port 180, and forced outward through the pump discharge port 181 into a passageway 182 leading to the pipe 110 through an elbow 183, the pipe 110 conducting the oil to the oil tank 106. If the gear 143 should rotate in the opposite direction, the idler gear and crescent assembly would be rotated through 180°, as set forth in my co-pending application, Serial No. 145,586, with the result that the oil would still be admitted through suction port 180, and forced out through elbow 183. The force pump is constructed in exactly the same manner except that oil is admitted thereto through the pipe 107 from the oil tank so that the opening 175, strainer 176, and opening 177, are omitted. The pump gear housing has a cross section as shown in Fig. 9, the oil being admitted thereto through suction port 180, and forced outwardly therefrom through discharge port 181 having connections with the parts requiring lubrication as will be more fully explained hereafter.

The force pump receives lubricating medium from tank 106 through pipe 107 (Fig. 22), and forces the same outwardly through the pump discharge port 181 in the pump gear housing 178 (Fig. 9) into a passage 200 drilled through the casing 30 which communicates with a main distributor passage 201 drilled radially through a boss in the wall of the suction manifold 65. A branch 202 of the distributor passage extends forwardly through a boss 203 cast with the main housing 30 (Fig. 2). As shown in Fig. 10, a crossbore 204 permits oil to flow outwardly through a passage 205 extending to the front of the main housing 30, which passage leads to the unloader master valve as will presently appear. A second branch 207 extends rearwardly through a cast plug which passes through the suction manifold 65 and leads to the rear end of the main housing 30. The passage 207 leads to a pressure regulating or relief valve mechanism, as will presently appear. A third branch 208 leads from the distributor passage 201 to an opening in the portion of the main housing 30 to which the pump driving gear supporting member 140 is fastened for the purpose of lubricating the pump driving gears. A branch 210 extends from the second branch 207, through the journal member 36 into an annular space surrounding the main bearing 35 through which lubricating medium is conducted to lubricate the bearings of the driving shaft and associated mechanism such as the crank rods 49.

Figs. 11 and 12 show the end of the main housing 30 and a portion of the rear cover 31, the views showing the second passage 207 communicating with a passage 215 drilled through a portion of the rear cover 31. The end of the passage 215 is closed by a threaded plug 216 forming a seat for one end of a spring 217 urging a relief valve piston 218 into closed position as illustrated. The piston is provided with oil relief passage 219 which prevents the piston from becoming blocked by trapped oil and communicates through opening 220 with a passage 221 leading to the interior of the compressor housing so as to permit the return of any oil which passes the end of the valve piston. The valve piston is forced toward the right under pressure of the oil force pump and first uncovers a passage 222 leading to a pipe 223 which conducts oil into the interior of the shaft seal 37, from which the oil is returned to the interior of the crank case through a passage 224 (Fig. 1). If the oil pressure becomes greater than that desired, the piston moves further toward the right against the influence of spring 217 and uncovers the passage 221 permitting the escape of oil into the interior of the compressor so that the lubricating system is never permitted to have interior pressures greater than a desired maximum. Since the strength of the spring 217 is determined at a proper figure, it is a result that the piston 218 continuously floats from its position so as to uncover port 221 or to partially cover the same, so that a constant oil pressure is maintained within the distributor passage 201 and its branches.

The oil which passes through passage 210 into the annular space within bearing 35, is forced into a central bore 230 extending longitudinally of shaft 33 (Fig. 1) from which side-passages lead to the rear cover bearing 34, the bearing ring 48, and the piston rods 49.

The pressure relief valve mechanism and the shaft bearing lubricating mechanism are identical in substance with those illustrated and claimed in my co-pending application, Serial No. 145,587, filed May 29, 1937.

Oil which passes through the third branch 208 is admitted to an oil passage 235, bored through the pump driving gear supporting member 140, which leads to a passage 236 and cross-passages 237 and 238 which communicate with the bearings of pump driving gear shafts 150 and 151, respectively, (Fig. 4); and the passage 236 also continues upward to lubricate the bearings of oil pump driving gear shaft 142 (Fig. 5).

All rotating parts or reciprocating parts of the compressor are thus lubricated by oil under pressure, or otherwise, the bearings of all rotating shafts and the piston rod bearings being lubricated by oil under pressure, and the reciprocating pistons and other parts being lubricated by oil flung thereinto by the rotating shaft. The sealing surfaces of shaft seal 37 are lubricated by oil conducted thereto under pressure through pipe 223.

The oil which passes through the first branch from distributor passage 201 through the passage 205 in the end of main housing 30, is led into an opening 250 in the front cover 32 into which is threaded an elbow 251 to which is fastened a tube 252 leading to the unloader master valve 253 (Figs. 17 and 18). The master valve 253 comprises a housing 254 (Fig. 19) bolted to a pair of bosses 255, extending inwardly from the front cover 32. A master valve liner 256 is inserted into the housing, the valve liner being provided with a plurality of slots 260, each of which communicates with an individual opening through the housing 254; each such opening being connected to a tube 261 leading to elbows 262 threaded into openings 263 in the front cover 32. Each opening 263 is so placed as to be longitudinally in line with the center of one of the cylinders 60. Inside of the master valve liner 260 is a plunger 265 provided with an enlarged head 266 which is always beyond the end of tube 252. The plunger is provided with a reduced central portion into which oil is conducted through openings 267 in the valve liner 254. At the upper end of the reduced portion is an enlarged head 270, which upon movement of the plunger, successively blocks the slots 260. Beyond the enlarged portion 270 is an oil escape collector slot 271 which, through a crossbore and central bore through the plunger 265, conducts any oil escaping around the head 270 into the interior of the compressor. The outer end of the plunger is provided with a plurality of notches 275, spaced substantially the same distance apart as the slots 260, which are successively engaged by a spring-pressed ball 276 mounted in an opening of the liner 256 and resiliently urged into engagement with the notches 275 by a spring held in a retainer member 277. The purpose of the ball is to make certain that the plunger 265 will move in short steps so that at each movement thereof, a slot 260 will be covered or uncovered depending upon the direction of movement of the plunger, whereby to conduct oil under pressure into a greater or lesser number of the openings 263.

Each opening 263 leads to a bore 280 extending longitudinally inward toward the associated cylinder (Fig. 1). Within each bore 280 there is a piston 281 which is urged toward the front of the machine by a spring 282. The piston is associated with a plunger 283 which extends through an opening in the front wall of the suction manifold 65. The piston is preferably provided with a plurality of circumferential grooves 284 (Fig. 16) for the purpose of preventing oil from escaping past the same, and each bore 280 is provided with a leak opening 285 (Fig. 1) for the purpose of relieving pressures which may be built up due to any oil that does escape past the piston. The spring 282 urges the piston toward the front cover, but its strength is such as to be overcome by the pressure of the oil from the force pump which is transmitted thereto by the uncovering of the slot 260 in the master valve liner 256, so that the piston and plunger can be forced to move toward the rear cover as shown in Figs. 1 and 13. When in the position illustrated in Figs. 1 and 13, the cylinder is "loaded", and when the piston is forced toward the front cover by the spring 282, the cylinder is "unloaded" by the following means: The plunger 283 is connected to an unloader cam follower 290 which, as shown in Fig. 15, is composed of two arms circumferentially embracing the cylinder liner 61, the member 290 being hingedly connected by means of a pin 291 to the end of plunger 283 so as to be free to move angularly with respect thereto. Each arm of the member 290 is provided at its terminus with a slot 292 within which are mounted a pair of rollers 293 and 294. The rollers are retained within the slot by bezels 295 formed by peening a portion of the metal surrounding the slot. The roller 294 rides upon an unloader cam 296 (Fig. 13) which is fastened to the inner wall 64 of the suction manifold 65. The upper roller 293 supports an unloader pin holding ring 300 which is slidably mounted upon the cylinder liner 61. A plurality of circumferentially spaced unloader pins 301 are fastened to the ring 300 and extend longitudinally of the sleeve 61 through guiding extension 302 and the upper flange of the cylinder liner which likewise supports the screen 71 and forms the valve seat for the suction valve 75. The lower portion of each pin 301 is enlarged, and above the extension 302 is frictionally gripped by a coil of wire 303 which acts as a safety guard to prevent the ring 300 from dropping and from chattering during operation of the machine. Centrally of each pin there is provided an enlarged portion 304 forming a flange against which bears a spring 305 under compression, the other end of the spring 305 bearing against the end flange of the sleeve 61. When the member 290 is in the position shown, the springs 305 hold the pins and ring 300 in depressed position which as shown, means that the ends of the pins 301 are beneath the level of the seats of the suction valve 75, so that the mechanism does not interfere with the normal operation of the valve and the associated cylinder is "loaded", which is to say that it will deliver compressed gas. However, if the spring 282 moves the member 290 on toward the right so that roller 294 climbs the incline of cam 296, the roller 293 will lift ring 300, and the pins 301 will lift valve 75 against the springs 77, so that the suction valve is continuously held in open position; in such case, gas entering the cylinder space through ports 70 and 85 is forced back into suction manifold 65 through ports 70, since the discharge pressure existing in discharge space 86 is never overcome and the discharge valve 76 always remains seated. The net effect, therefore, is an accomplishment of no useful work.

In order to operate the unloading mechanism, there is provided an unloader control means 320 (Figs. 17 to 21 inclusive), as seen in Fig. 19, the front cover 32, is provided with an opening which is sealed by a cap 321. To the inner surface of the cap there is soldered one end of a flexible metal bellows 322, the inner end of which is soldered to a disk 323 and extends to one end of a pair of levers 325 pivotally mounted at 326 on an extension 327 of the master valve housing 254. The connecting rod 324 is free to have slight lateral movement so that the pivotal connection thereof to levers 325 may be fixed, but the other ends of the levers 325 are pivoted at 328 to the free end of master valve plunger 265 through a lost motion connection. Any movement of rod 324 is multiplied by the lever 325, causing a larger movement of plunger 265. Soldered within the cap 321 is a bellows guiding and limiting sleeve 330, within which is positioned a spring 331 bearing against the disk 323. The other end of the spring extends outwardly through a threaded member 335, soldered to the outer surface of cap 321. The member 335 forms an unloader adjusting fixture and is provided with diametrically opposed slots through which extend lugs 336 and 337 on the outer edge of a spring retaining member 338. The retaining member 338 is thus guided for longitudinal movement without turning, and may be moved the length of the slots in the adjusting fixture 335 without twisting the spring 331. An adjusting nut 339 is provided for the purpose of adjusting the position of the member 338, and a lock nut 340 is provided to lock the nut 339 in adjusted position. A manual shifting rod 350 is soldered to the end of connecting rod 324 and the surface of disk 323, and extends centrally outward through the adjusting means. A rod guiding and locking nut 351 is threaded onto rod 350, and a lock nut 352 is provided for the purpose of locking nut 351 in position.

In operation of the compressor as a refrigerant compressor, it will be apparent to those skilled in the art that the suction pressure will vary in accordance with the load upon the system. If a compressor operating at a constant speed and having a definite capacity were provided, it would be readily apparent that the compressor would "cycle on and off", the length of operating periods being determined by the load on the compressor, and the stopping of the compressor being determined by the action of the low-pressure or high-pressure cut-outs. This cycling operation is undesirable since a high starting-torque motor must normally be provided for a compressor of fixed capacity and the continual use of high starting current will mean a high power cost. With the present invention, a motor of low starting-torque may be provided since the greatest demand upon the motor will only come after the motor has obtained full speed since the cylinders are all unloaded unless the force pump is operating. When the system is at rest, the suction valves are held in open position due to the lack of oil pressure against the pistons 281 which means that the roller 294 will have climbed the incline of cam 296. When the motor is starting the first reciprocation of the pistons will result in no compression being performed. However, as the motor reaches a higher speed the force pump 180 will commence to build up oil pressure within the distributing passage 201 and its branches until a regulated pressure is achieved due to the operation of the oil pressure regulating and relief valve 218. Since inactivity of the compressor results in a higner internal pressure within the compressor than would be encountered during operation thereof, the bellows 322 has been collapsed against the force of spring 331, thereby drawing the plunger 265 out to its fully open position. Oil under pressure, which is admitted to the master valve through tube 252, passes through all of the slots 260, into all of the tubes 262 and openings 263. thereby exerting pressure against all of the pistons 281. As a result, all of the pistons are moved toward the position shown in Figure 13, permitting all of the suction valves 75 to become seated and the compressor will commence to operate at full capacity. This rapidly lowers the pressure existing within the suction manifold 65 and the suction side of the refrigerating system and, through the openings 68, results in a lowering of pressure within the space 67 within which is located the bellows 322. As soon as the pressure exerted against disk 323 has been reduced sufficiently to permit spring 331 to move the plunger 265 against the frictional force of ball 276, one of the cylinders will be unloaded since the supply of oil under pressure thereto has been cut off. If the remaining cylinders still compress more gas than demanded of the refrigerating system, the spring 331 will further expand bellows 322 and the cylinders will be unloaded in proportion to the movement of bellows 322. The compressor can be adjusted to the system with which it is associated by operating the same under its greatest load and adjusting the compression of spring 331 so as to permit the suction pressure resulting in the interior space 67 to balance against the force of spring 331. Then as a result, if the load reduces or varies from time to time, the capacity of the compressor will also vary in direct response thereto.

I have thus explained the means whereby I am able to use a single compressor for loads which may vary over a considerable range. Thus if the compressor is used for air conditioning, a space normally requiring twenty-one tons of refrigeration when loaded to its maximum extent will require a seven cylinder compressor of which each cylinder delivers three tons making a total of twenty-one tons with each cylinder loaded. Then as the temperature of the air to be conditioned lessens by reason of a drop in outside temperature, or by reason of a lessening of human occupancy, or for other well-known reasons, the number of cylinders in operation will be correspondingly reduced, and the capacity of the system will likewise be reduced in steps of three tons each. Also, a seven cylinder compressor may be connected in a refrigerating system comprising seven rooms each having a three ton load, or several rooms having various loads; and if one or more of the rooms requires no cooling the compressor will nevertheless operate efficiently.

The unloader master piston may be manually controlled by moving the rod 350 in or out so as to load or unload various numbers of the cylinders, an especially important factor in practical operation. Also the nut 351 may be screwed inward so as to bear against the end of fixture 335 thereby rendering the unloading master valve partially or entirely inoperative at will.

Aside from the ability to use my compressor with a low starting-torque motor due to its achieving full speed before it becomes loaded, an important advantage is realized since a motor can be used, which while operating at constant speed, will consume power directly in proportion to the torque on its shaft. Therefore, if the number of cylinders in operation is less than the total, the cost of operating the compressor will be reduced correspondingly.

A further object of my invention and advantage thereof is illustrated in Figures 23 and 24, wherein it is shown that one motor can be attached to two compressors, which if of the seven-cylinder type as shown, may be combined so as to deliver (when of such capacity as to deliver three tons per cylinder) a total of forty-two tons or any fraction thereof in steps of three tons.

The above examples are not meant to be limiting upon my invention since it is obvious that the compressors may be so proportioned to deliver anything from a fraction of a ton to a much larger number of tons per cylinder, it being my purpose in selecting the three-ton size for the above examples to demonstrate to those skilled in the art that I have a compressor which is the most economical for any installation.

The foregoing examples illustrate the use of suction pressure as a means of controlling the operation of the compressor. However, suction pressure is a function of the load upon the compressor since the greater the load the more the refrigerant will be super-heated; and the suction pressure will rise correspondingly, resulting in the operation of fewer cylinders to decrease the amount of refrigerant supplied to take care of the load. It will be readily apparent to those skilled in the art that other functions of the load will vary in accordance with the load such as the temperature of the condenser cooling water, the superheat of the expanded refrigerant, or the wet or dry bulb temperatures of the air being conditioned. Fig. 25 shows in schematic fashion the control of a compressor in accordance with such other functions of the load upon an air conditioning unit.

In the form of the invention schematically set forth, the main compressor housing 30 is indicated as being closed by a front cover 32, similar to the corresponding parts previously described except that the openings 263, which communicate with the bores 280 within which are placed the unloader device operating plungers, extend through the front cover and communicate with pipes 262 leading to a master valve 253 located in a separate hermetically sealed chamber 375. The master valve 253 comprises a housing 254 within which is located a plunger 265 carried by links 325 mounted upon extension 327 and operated by rod 324 extending from the pressure responsive bellows 322. A regulating device 320 is located on the outside of chamber 375 and consists of the threaded member 335, spring adjusting nut 339, lock nut 340, and the guiding nut 351. All parts of the master valve and regulating device are similar to those previously described and need not be further detailed. The master valve is supplied with a fluid such as lubricating oil under pressure transmitted thereto by a pump 108 having a suction inlet 107 taking the fluid from a tank 106. The fluid transmitting pipe 252 passes through a pressure regulating valve 218 having a by-pass 221 through which excess fluid may be returned to the tank. Any fluid which leaks past the ends of the master valve may return to the tank as schematically indicated through passage 376. The pump, pressure regulating valve and tank may be those previously described and illustrated or separate parts may be supplied in conjunction with chamber 375 as long as the pump operates in unison with the compressor and compressor motor. When the pump 218 is not operating all of the pistons of the compressor will be unloaded, and during operation of the pump those cylinders which have been placed in communication therewith by the master valve will be loaded as previously described.

The chamber 375 is subjected to a pressure, varying in accordance with the load on the compressor, through a tube 377 communicating therewith and leading to some pressure creating means sensitive to a function of the load such as the thermostatic fluid containing bulb 378, placed in heat conducting relationship with the suction pipe 101 of the refrigerating system, or a similar bulb 379, placed in heat conducting relationship with the water outlet manifold 99 of the condenser 97, or a similar bulb 380 placed in the path of the air entering the air conditioning unit 381.

A conventional air conditioning system is indicated in Fig. 25, the unit comprising the compressor 30 from which compressed gaseous refrigerant is discharged through discharge pipe 93 into the condenser 97. Cold water enters the condenser through water manifold 98, passes through tubes within the condenser and emerges through the exhaust manifold 99. If the water flow is constant, it will be readily apparent that the temperature of the water leaving the condenser will vary in proportion to the amount of heat imparted thereto, this amount varying in accordance with the load on the air conditioning system since the pressure and temperature of the compressed gas rises in direct ratio to the load upon the evaporator coil 382. Hence the number of cylinders in operation will be affected by the temperature of the condenser cooling water since the higher the temperature, the higher the pressure will be in chamber 375, and the greater the number of cylinders will be loaded.

The condensed refrigerant passes into a liquid receiver 383 from which extends a pipe having placed therein an expansion valve 384 through which the refrigerant is expanded into the evaporator coil 382. It is customary to vary the orifice of an expansion valve by means of a device sensing the superheat of the refrigerant returning through the suction pipe 101, this device usually comprising a thermostatic bulb 385 connected by tube 386 to a motor 387 for operating the valve regulating mechanism. Accordingly, as the load on the evaporator coil varies, the amount of refrigerant admitted thereto will vary, which causes not only varying pressure within the condenser 97, but also, varying superheat of the gas within suction pipe 101. If the limits of the expansion valve are definitely fixed as is usually the case, there will be times when a compressor operating at full capacity will supply more refrigerant than can be passed through the orifice of the expansion valve, and accordingly, the safety devices such as high and low pressure cutouts, will cause the compressor to cycle on and off. However, by the use of a thermostatic bulb 378 located in position to sense the superheat of the refrigerant in suction pipe 101, the pressure within chamber 375 may be varied so as to vary the capacity of the compressor, since the greater the load the higher the superheat of the expanded refrigerant will be, and the higher the pressure existing within chamber 375. Accordingly, more refrigerant will be required and a bellows 322 and regulating device 320 can be utilized to cause a greater number of cylinders to be placed in operation.

The thermostatic bulb 380 placed in advance of the evaporator coil 382 may be used as a means of controlling the compressor since the temperature, either wet or dry bulb, of the air passed through the evaporator coil 382 by the fan 390 is a function of the load upon the system. As the temperature rises the pressure within the chamber 375 will rise and the greater the number of cylinders will be placed in operation by the action of bellows 322' and regulating device 320'.

Another means of controlling the compressor exists inasmuch as the pressure within the liquid receiver 383 is a function of the load upon the system, since the greater the load the more refrigerant will be expanded through the expansion valve, and the less the pressure will be within the receiver, hence the less the pressure will be within the chamber 375 if connected to the receiver. Accordingly a bellows 322' and regulating device 320', which work contrary to bellows 322 and device 320, may be provided and will be brought into operation to load more of the cylinders, and vice versa.

My invention is not limited to refrigerating or air conditioning applications, since any function of the load on the compressor can control the operation of the compressor. Thus the pressure existing within a storage tank for compressed air may be utilized to unload cylinders of a compressor discharging compressed air thereinto. Other applications will be obvious to those skilled in the art.

Having described certain forms of my invention, it will be readily apparent to those skilled in the art that alterations in form and modification in detail may be devised which will come within the scope of my invention. All such changes as come within the scope of the following claims are to be considered as a part of my invention.

I claim:

1. A compressor comprising a plurality of cylinders, a common suction chamber and a common compression chamber, each cylinder having associated therewith a suction valve through which a gaseous medium may be admitted from said suction chamber and a discharge valve through which compressed gaseous medium may be discharged into said compression chamber, and means to render any one of the cylinders inoperative during operation of the compressor comprising a device responsive to the pressure existing within said suction chamber and acting to hold the suction valve in open position whereby gas admitted thereto from the suction chamber is directly returned to the suction chamber during what would otherwise be the compression stroke of the cylinder.

2. A compressor comprising a plurality of cylinders, a common suction chamber, unloading means in conjunction with each cylinder operatable to unload each cylinder when the compressor is at rest, fluid pressure creating means operating in unison with said compressor and creating sufficient pressure at a minimum speed to overcome said unloading means whereby to load all of the cylinders, and unloading control means responsive to the pressure in said chamber to disconnect said fluid pressure creating means from individual cylinder unloading means after the compressor has attained said minimum speed, said control means comprising a master valve movable in response to the pressure existing within said chamber.

3. A compressor comprising a plurality of cylinders, a common suction chamber, unloading means in conjunction with each cylinder operatable to unload each cylinder when the compressor is at rest, fluid pressure creating means operating in unison with said compressor and creating sufficient pressure at a minimum speed to overcome said unloading means whereby to load all of the cylinders, and unloading control means responsive to the pressure in said chamber to disconnect said fluid pressure creating means from individual cylinder unloading means after the compressor has attained said minimum speed, said control means comprising a master valve, and a flexible metallic bellows movable in response to the pressure existing within said chamber and connected to said master valve whereby to move the same in one direction upon an increase in pressure.

4. A compressor comprising a plurality of cylinders, a common suction chamber, unloading means in conjunction with each cylinder operatable to unload each cylinder when the compressor is at rest, fluid pressure creating means operating in unison with said compressor and creating sufficient pressure at a minimum speed to overcome said unloading means whereby to load all of the cylinders, and unloading control means responsive to the pressure in said chamber to disconnect said fluid pressure creating means from individual cylinder unloading means after the compressor has attained said minimum speed, said control means comprising a master valve, a flexible metallic bellows movable in response to the pressure existing within said chamber and connected to said master valve whereby to move the same in one direction upon an increase in pressure, and a spring acting against said bellows whereby to move the valve in the other direction upon a decrease in pressure.

5. A compressor comprising a plurality of cylinders, a common suction chamber and a common compression chamber, a pressure-responsive device in said suction chamber which is movable to varying extents according to the pressure in said suction chamber, a source of fluid pressure operating in unison with said compressor, a master valve having a plurality of ports successively connected to said source of fluid pressure upon movement of said pressure-responsive device, a plurality of passageways individually connected to said ports and leading to proximity with each of said cylinders, each of said cylinders having associated therewith a suction valve through which a gaseous medium may be admitted from said suction chamber and a discharge valve through which compressed gaseous medium may be discharged into said compression chamber, and means to render any one of the cylinders operative or inoperative during operation of the compressor comprising a spring, a device operated by said spring to hold the suction valve in open position whereby gas admitted to the cylinder from the suction chamber is directly returned to the suction chamber during what would otherwise be the compression stroke of the cylinder, and means to overcome said spring upon the admission of fluid under pressure to the passageway associated with the cylinder.

6. A compressor comprising a plurality of cylinders, a common suction chamber and a common compression chamber, a pressure-responsive device in said suction chamber which is movable to varying extents according to the pressure in said suction chamber, a source of fluid pressure operating in unison with said compressor, a master valve having a plurality of ports successively connected to said source of fluid pressure upon movement of said pressure-responsive device, a plurality of passageways individually connected to said ports and leading to proximity with each of said cylinders, each of said cylinders having associated therewith a suction valve through which a gaseous medium may be admitted from said suction chamber and a discharge valve through which compressed gaseous medium may be discharged into said compression chamber, and means to render any one of the cylinders operative or inoperative during operation of the compressor comprising a plunger associated with each cylinder and operated by the admission of fluid under pressure to the passageway associated with the cylinder, a yoke pivotally connected to said plunger and partially surrounding the cylinder, fixed ramps under the free ends of said yoke, a spring opposing said plunger and causing the free ends of said yoke to climb said ramps, and valve lifting means operated by said free ends climbing said ramps and acting to hold the suction valve in open position when insufficient fluid pressure exists in said passageway whereby gas admitted to the cylinder from the suction chamber is directly returned to the suction chamber during what would otherwise be the compression stroke of the cylinder, and gas is compressed when the fluid pressure in said passageway causes said plunger to overcome said spring.

7. A compressor comprising a plurality of cylinders, a common suction chamber, unloading means in conjunction with each cylinder operatable to unload each cylinder when the compressor is at rest, fluid pressure creating means operating in unison with said compressor and creating sufficient pressure at a minimum speed to overcome said unloading means whereby to load all of the cylinders, and unloading control means responsive to the pressure in said chamber to connect or disconnect said fluid pressure creating means successively to or from individual cylinder unloading means in response to suction pressure after the compressor has attained said minimum speed, said control means comprising a master valve, a flexible metallic bellows movable in response to the pressure existing within said chamber and connected to said master valve to move the same in connecting direction upon an increase in pressure whereby to load the cylinders successively, a spring acting against said bellows to move the valve in disconnecting direction upon a decrease in pressure whereby to unload the cylinders successively and means to adjust the setting of said spring whereby to alter the range of pressure under which said bellows operates.

8. A compressor comprising a plurality of cylinders, a common suction chamber, unloading means in conjunction with each cylinder operatable to unload each cylinder when the compressor is at rest, fluid pressure creating means operating in unison with said compressor and creating sufficient pressure at a minimum speed to overcome said unloading means whereby to load all of the cylinders, and unloading control means responsive to the pressure in said chamber to connect or disconnect said fluid pressure creating means successively to or from individual cylinder unloading means in response to suction pressure after the compressor has attained said minimum speed, said control means comprising a master valve, a flexible metallic bellows movable in response to the pressure existing within said chamber and connected to said master valve to move the same in connecting direction upon an increase in pressure whereby to load the cylinders successively, a spring acting against said bellows to move the valve in disconnecting direction upon a decrease in pressure whereby to unload the cylinders successively, and means to adjust the setting of said spring whereby to alter the range of pressure under which said bellows operates; in combination with means to limit the range of movement of said valve whereby to render said unloading control means inoperative for selected cylinders.

9. A compressor comprising a plurality of cylinders, a common suction chamber, unloading means in conjunction with each cylinder operatable to unload each cylinder when the compressor is at rest, fluid pressure creating means operating in unison with said compressor and creating sufficient pressure at a minimum speed to overcome said unloading means whereby to load all of the cylinders, and unloading control means responsive to the pressure in said chamber to connect or disconnect said fluid pressure creating means successively to or from individual cylinder unloading means in response to suction pressure after the compressor has attained said minimum speed, said control means comprising a master valve, a flexible metallic bellows movable in response to the pressure existing within said chamber and connected to said master valve to move the same in disconnecting direction upon an increase in pressure whereby to load the cylinders successively, a spring acting against said bellows to move the valve in disconnecting direction upon a decrease in pressure whereby to unload the cylinders successively, and means to adjust the setting of said spring whereby to alter the range of pressure under which said bellows operates; in combination with means to limit the range of movement of said valve whereby to render said unloading control means inoperative for selected cylinders, said limiting means being adjustable during operation of the compressor whereby to prevent the unloading of any or all of the cylinders in response to suction pressure at any time.

CHARLES R. NEESON.